(12) United States Patent
Tamachi et al.

(10) Patent No.: US 11,740,892 B2
(45) Date of Patent: Aug. 29, 2023

(54) VEHICLE CONTROL APPARATUS

(71) Applicant: TOYOTA JIDOSHA KABUSHIKI KAISHA, Toyota (JP)

(72) Inventors: Toshiaki Tamachi, Seto (JP); Yuuki Makino, Aichi-gun (JP); Masafumi Yamamoto, Nagakute (JP); Koichi Okuda, Toyota (JP); Atsushi Tabata, Okazaki (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 25 days.

(21) Appl. No.: 17/590,854

(22) Filed: Feb. 2, 2022

(65) Prior Publication Data

US 2022/0253304 A1  Aug. 11, 2022

(30) Foreign Application Priority Data

Feb. 8, 2021 (JP) .................................. 2021-018573

(51) Int. Cl.
*G06F 8/65* (2018.01)
*B60W 50/00* (2006.01)

(52) U.S. Cl.
CPC .............. *G06F 8/66* (2013.01); *B60W 50/00* (2013.01); *B60W 2050/0083* (2013.01); *B60W 2520/04* (2013.01); *B60W 2540/215* (2020.02)

(58) Field of Classification Search
CPC ..... B60W 2520/04; B60W 2050/0083; B60W 2540/215; B60W 50/00; G06F 8/66
See application file for complete search history.

(56) References Cited

U.S. PATENT DOCUMENTS

| | | | | |
|---|---|---|---|---|
| 9,575,743 | B1* | 2/2017 | Chun | G06F 8/654 |
| 2005/0256614 | A1* | 11/2005 | Habermas | B60L 3/0023 |
| | | | | 701/1 |
| 2015/0339114 | A1* | 11/2015 | Rockwell | G06F 8/65 |
| | | | | 701/1 |
| 2016/0202966 | A1* | 7/2016 | Vangelov | H04L 67/12 |
| | | | | 717/172 |
| 2016/0366229 | A1* | 12/2016 | Yamaura | H04L 67/56 |
| 2017/0060559 | A1* | 3/2017 | Ye | G06F 8/65 |
| 2017/0123784 | A1* | 5/2017 | Zymeri | G06F 8/65 |

(Continued)

FOREIGN PATENT DOCUMENTS

JP 2019-137243 A 8/2019

*Primary Examiner* — Phillip H Nguyen
(74) *Attorney, Agent, or Firm* — Oblon, McClelland, Maier & Neustadt, L.L.P.

(57) ABSTRACT

A vehicle control apparatus including: a storage portion configured to store therein a vehicle control software for controlling a vehicle; an updating portion configured to update the vehicle control software stored in the storage portion, to an update software, and an operation check portion configured, when the update software is stored in the storage portion, to make an operation check as to whether the vehicle operates normally or not, by executing processing of the update software on condition that the vehicle is in a vehicle stopped state in which the vehicle is suppressed from being moved in forward and reverse directions. When it is checked by the operation check portion that the vehicle operates normally with the processing of the update software, the updating portion is configured to update the vehicle control software to the update software.

4 Claims, 3 Drawing Sheets

(56) References Cited

U.S. PATENT DOCUMENTS

| | | | | |
|---|---|---|---|---|
| 2018/0152341 | A1* | 5/2018 | Maeda | H04L 41/082 |
| 2018/0189049 | A1* | 7/2018 | Madrid | G06F 21/575 |
| 2019/0108010 | A1* | 4/2019 | Tillman | H04L 67/12 |
| 2019/0258469 | A1* | 8/2019 | Hayashidera | G06F 8/656 |

* cited by examiner

VEHICLE CONTROL APPARATUS

This application claims priority from Japanese Patent Application No. 2021-018573 filed on Feb. 8, 2021, the disclosure of which is herein incorporated by reference in its entirety.

FIELD OF THE INVENTION

The present invention relates to a vehicle control apparatus capable of updating a software for controlling a vehicle.

BACKGROUND OF THE INVENTION

There is known a vehicle control apparatus configured to receive an update software from a server or the like, and to update a stored software (stored in a vehicle) to the received update software. A vehicle control system disclosed in JP-2019-137243A is an example of such a vehicle control apparatus. This Japanese Patent Application Publication proposes an arrangement for avoiding malfunction of vehicle equipment, as much as possible, which could be caused due to update of the software. In the proposed arrangement, a rehearsal processing is executed to actually execute processing of the update software to which the stored software is to be updated, so as to make an operation check as to whether the vehicle equipment could be normally controlled or not, with the processing of the update software.

SUMMARY OF THE INVENTION

By the way, in the arrangement proposed in the above-identified Japanese Patent Application Publication, when the stored software is to be updated to the update software, the operation check is made as to whether the vehicle equipment could be normally controlled or not, by the rehearsal processing, i.e., executing the processing of the update software to make the operation check, so that a reliability is improved. However, there is a risk that an unintentional behavior of the vehicle could be caused when the rehearsal processing is executed to make the operation check.

The present invention was made in view of the background art described above. It is therefore an object of the present invention to provide a vehicle control apparatus capable of suppressing an unintentional behavior of a vehicle that could be caused during an operation check that is made when a vehicle control software is updated to an update software, wherein the operation check is made as to whether the vehicle operates normally or not by executing processing of an update software.

The object indicated above is achieved according to the following aspects of the present invention.

According to a first aspect of the invention, there is provided a vehicle control apparatus comprising: a storage portion configured to store therein a vehicle control software for controlling a vehicle; an updating portion configured to update the vehicle control software stored in the storage portion, to an update software, and an operation check portion configured, when the update software is stored in the storage portion, to make an operation check as to whether the vehicle operates normally or not, by executing processing of the update software on condition that the vehicle is in a vehicle stopped state in which the vehicle is suppressed from being moved in forward and reverse directions, wherein, when it is checked by the operation check portion that the vehicle operates normally with the processing of the update software, the updating portion is configured to update the vehicle control software to the update software. It is noted that the above-described update software may be referred to also as "new software".

According to a second aspect of the invention, in the vehicle control apparatus according to the first aspect of the invention, the operation check portion is configured to inquire an occupant of the vehicle whether the operation check can be made or not, and to execute the processing of the update software to make the operation check when a permission is given by the occupant of the vehicle to make the operation check.

According to a third aspect of the invention, in in the vehicle control apparatus according to the first or second aspect of the invention, the operation check portion is configured to discontinue the processing of the update software, when the vehicle is switched from the vehicle stopped state to a runnable state in which the vehicle is enabled to run, during the processing of the update software.

According to a fourth aspect of the invention, in in the vehicle control apparatus according to the third aspect of the invention, the vehicle includes an electric actuator that is to be operated to switch between a vehicle stop range and a vehicle non-stop range that is other than the vehicle stop range, such that the vehicle is placed in the vehicle stopped state when the vehicle stop range is established, wherein the operation check portion is configured, when an operation is made to switch from the vehicle stop range to the vehicle non-stop range during the processing of the update software, to delay switching from the vehicle stop range to the vehicle non-stop range, until discontinuation of the processing of the update software is completed.

In the vehicle control apparatus according to the first aspect of the invention, when the operation check as to whether the vehicle operates normally or not is to be made by executing the processing of the update software, the processing of the update software is executed on condition that the vehicle is in the vehicle stopped state in which the vehicle is suppressed from being moved in the forward and reverse directions. Therefore, it is possible to suppress an unintentional behavior of the vehicle that could be caused during the operation check and to improve a reliability of the vehicle.

In the vehicle control apparatus according to the second aspect of the invention, the occupant of the vehicle is inquired whether the operation check can be made or not, and the processing of the update software is executed when the permission is given by the occupant of the vehicle to make the operation check, so that it is possible to improve convenience for the occupant of the vehicle.

In the vehicle control apparatus according to the third aspect of the invention, when the vehicle is switched from the vehicle stopped state to the runnable state during the processing of the update software, the processing of the update software is discontinued, so that it is possible to suppress an unintentional behavior of the vehicle that could be caused if the processing of the update software is continued in the runnable state of the vehicle.

In the vehicle control apparatus according to the fourth aspect of the invention, when the operation is made to switch from the vehicle stop range to the vehicle non-stop range during the processing of the update software, the switching from the vehicle stop range to the vehicle non-stop range is delayed until the discontinuation of the processing of the update software is completed, so that it is possible to suppress the unintentional behavior of the vehicle, which has not been expected by the occupant of the vehicle.

DETAILED DESCRIPTION OF PREFERRED EMBODIMENT

Hereinafter, preferred embodiment of the invention will be described in detail with reference to the accompanying drawings. The figures of the drawings are simplified or deformed as needed, and each portion is not necessarily precisely depicted in terms of dimension ratio, shape, etc.

Embodiment

Figure 1:
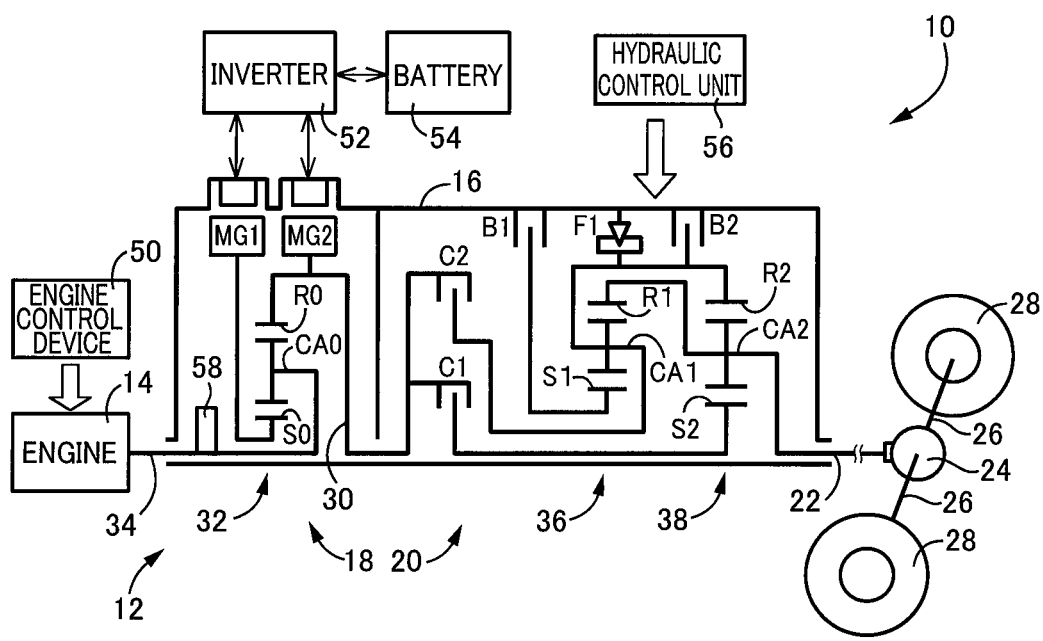
FIG. 1 is a schematic view showing a construction of a vehicle to which the present invention is applied.

FIG. 1 is a schematic view showing a construction of a vehicle 10 to which the present invention is applied. The vehicle 10 includes an engine 14, a first rotating machine MG1 and a second rotating machine MG2, and is a hybrid electric vehicle in which the engine 14 and the second rotating machine MG2 serve as drive power sources for driving the vehicle 10. The vehicle 10 further includes a power transmission apparatus 12 that constitutes a drive-power transmission path between the engine 14 and drive wheels 28. The power transmission apparatus 12 includes a casing 16 as a non-rotary member, an electrically-operated continuously-variable transmission portion 18 and a mechanically-operated step-variable transmission portion 20. The continuously-variable transmission portion 18 and the step-variable transmission portion 20 are provided within the casing 16, and are arranged in a series on a common axis. The continuously-variable transmission portion 18 is connected to the engine 14 directly or indirectly through, for example, a damper (not shown). The step-variable transmission portion 20 is connected to an output rotary member of the continuously-variable transmission portion 18. The power transmission apparatus 12 further includes a differential gear device 24 connected to an output shaft 22 that is an output rotary member of the step-variable transmission portion 20, and a pair of axles 26 connected to the differential gear device 24.

In the power transmission apparatus 12, the drive power outputted from the engine 14 or the second rotating machine MG2 is transmitted to the step-variable transmission portion 20, and is then transmitted from the step-variable transmission portion 20 to the drive wheels 28 of the vehicle 10, for example, through the differential gear device 24. It is noted that the power corresponds to a torque or a force unless otherwise distinguished from them. It is also noted that the power transmission apparatus 12 including the continuously-variable transmission portion 18 and the step-variable transmission portion 20 is constructed substantially symmetrically about its axis corresponding to the above-described common axis, so that a lower half of the power transmission apparatus 12 is not shown in FIG. 1.

The engine 14 serves as the drive power source capable of generating a drive torque, and is a known internal combustion engine such as gasoline engine and diesel engine. The vehicle 10 is provided with an engine control device 50 that includes a throttle actuator, a fuel injection device and an ignition device. With the engine control device 50 being controlled, an engine torque Te, which is an output torque of the engine 14, is controlled.

Each of the first and second rotating machines MG1, MG2 is a rotating electric machine having a function serving as an electric motor and a function serving as a generator. That is, each of the first and second rotating machines MG1, MG2 is a so-called "motor generator". The first and second rotating machines MG1, MG2 are connected to an electric storage device in the form of a battery 54 provided in the vehicle 10, through an inverter 52 provided in the vehicle 10. The inverter 52 is controlled by a running control device 90 whereby an MG1 torque Tg and an MG2 torque Tm as output torques of the respective first and second rotating machines MG1, MG2 are controlled.

The continuously-variable transmission portion 18 is provided with: the above-described first rotating machine (first motor/generator) MG1; a differential mechanism 32 serving as a drive-force distributing device to mechanically distribute the drive force of the engine 14 to the first rotating machine MG1 and to an intermediate transmission member 30 that is an output rotary member of the continuously-variable transmission portion 18; and a second rotating machine (second motor/generator) MG2 connected to the intermediate transmission member 30 in a drive-force transmittable manner. The differential mechanism 32 is constituted by a planetary gear device of a single-pinion type having a sun gear S0, a carrier CA0 and a ring gear R0. The carrier CA0 is connected to the engine 14 through a connecting shaft 34 in a drive-force transmittable manner, and the sun gear S0 is connected to the first rotating machine MG1 in a drive-force transmittable manner, while the ring gear R0 is connected to the second rotating machine MG2 in a drive-force transmittable manner. The continuously-variable transmission portion 18 is an electrically-controlled continuously-variable transmission wherein a differential state of the differential mechanism 32 is controllable by controlling an operation state of the first rotating machine MG1. It is noted that the connecting shaft 34 is connected to a mechanically-operated oil pump 58 that is to be driven by the power of the engine 14.

The step-variable transmission portion 20 is a mechanically-operated transmission mechanism which constitutes a part of a drive-power transmitting path between the continuously-variable transmission portion 18 and the drive wheels 28. The step-variable transmission portion 20 is a known automatic transmission of a planetary gear type which is provided with a plurality of planetary gear devices in the form of a first planetary gear device 36 and a second planetary gear device 38, and a plurality of engagement devices including a clutch C1, a clutch C2, a brake B1 and a brake B2. Hereinafter, the clutch C1, clutch C2, brake B1 and brake B2 will be referred to as "engagement devices CB" unless otherwise specified. Each of the engagement devices CB receives an engagement hydraulic pressure PRcb that is controlled by a hydraulic control unit (hydraulic control circuit) 56 provided in the vehicle 10. When a gear position is selected, based on an accelerator operation amount (accelerator opening degree θacc) and a running speed V of the vehicle 10, for example, so as to be established in the step-variable transmission portion 20, operation states of the respective engagement devices CB are controlled such that corresponding at least one of the engagement devices CB is engaged for establishing the selected gear position. It is noted that the hydraulic control unit 56 is configured to receive a working fluid supplied from the mechanically-operated oil pump 58 or supplied from an electrically-operated oil pump (not shown).

Figure 2:
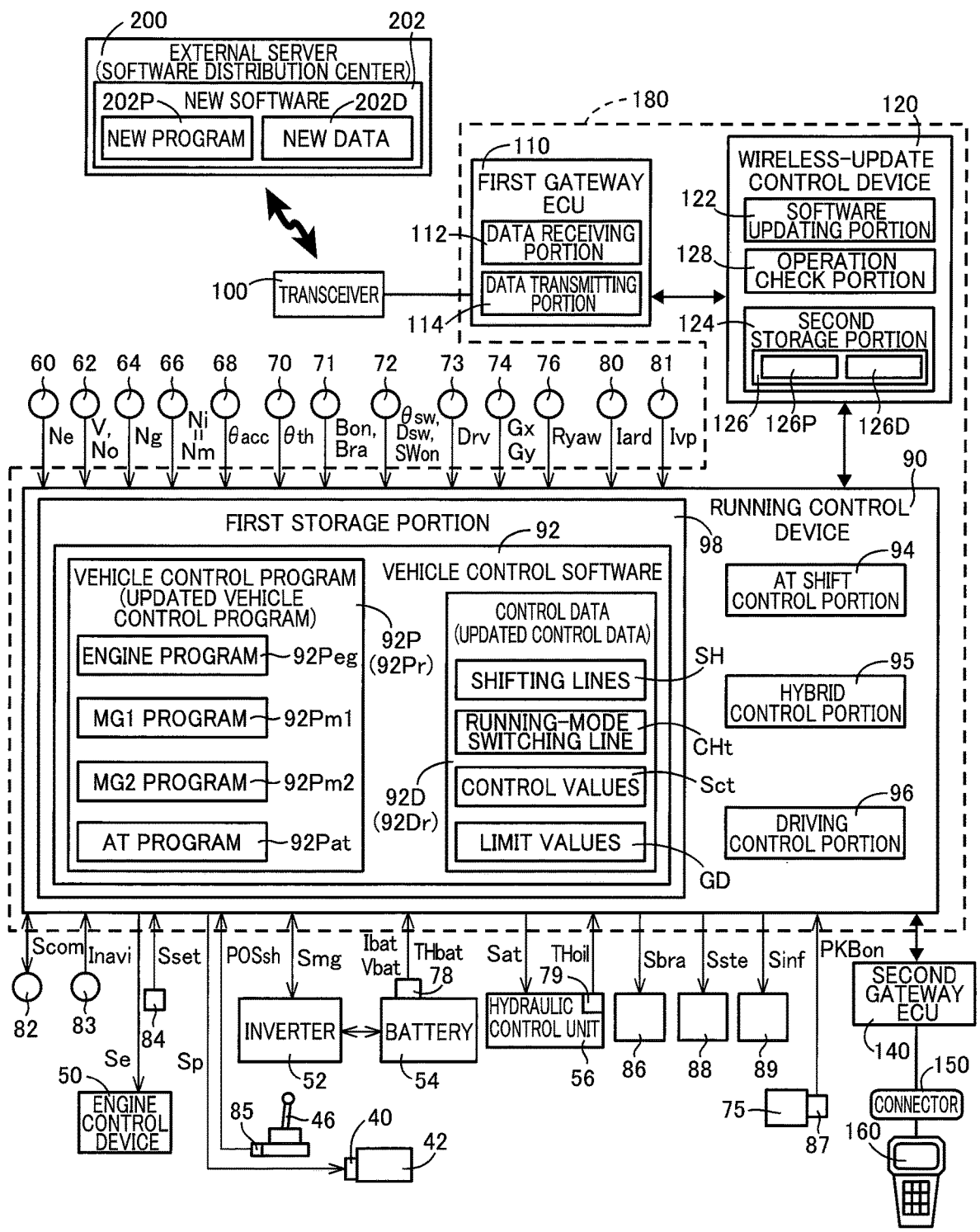
FIG. 2 is a schematic view showing a construction of a system for executing various control operations in the vehicle shown in FIG. 1.

The vehicle 10 includes an electric motor 40 (see FIG. 2) that is to be operated to electrically switch between a P range (vehicle stop range) and a non-P range (vehicle non-stop range) that is other than the P range. That is, the vehicle 10 employs a so-called shift-by-wire (SBW) system in which the P range and the non-P range are to be switched to each other through operation of the electric motor 40. As shown in FIG. 2, the electric motor 40 is connected to a parking lock mechanism 42 by which the P range and the non-P range are to be switched to each other, such that one of the P range and the non-P range is to be established in the power transmission apparatus 12 depending on a rotational position of the electric motor 40. The power transmission apparatus 12 is placed in a parking lock state when the P range is established, and is placed in a non-parking state when the non-P range is established. For example, when a shift lever 46 is placed in a P position as one of its operation positions POSsh, the running control device 90 outputs a command signal Sp requesting the parking lock mechanism 42 to be placed in the parking lock state, wherein the command signal Sp is supplied to the electric motor 40. With the command signal Sp being supplied to the electric motor 40, the electric motor 40 is rotated to be positioned in a rotational position corresponding to the P range, whereby the parking lock mechanism 42 is operated to establish the P range as one of shift ranges in the power transmission apparatus 12.

FIG. 2 is a schematic view showing a construction of a system for executing various control operations in the vehicle shown in FIG. 1. The vehicle 10 is provided with the running control device 90 configured to execute mainly the various control operations related to running of the vehicle 10. For example, the running control device 90 includes a so-called microcomputer incorporating a CPU, a ROM, a RANI and an input-output interface. The CPU performs control operations of the vehicle 10, by processing various input signals, according to control programs stored in the ROM, while utilizing a temporary data storage function of the RAM. The running control device 90 may be constituted by two or more control units exclusively assigned to perform respective control operations such as a control operation for controlling the drive power sources and a control operation for controlling the step-variable transmission.

The running control device 90 receives various input signals based on values detected by respective sensors provided in the vehicle 10. Specifically, the running control device 90 receives: an output signal of an engine speed sensor 60 indicative of the engine rotational speed Ne; an output signal of an output speed sensor 62 indicative of the output rotational speed No which is the rotational speed of the output shaft 22 and corresponds to the running speed V of the vehicle 10; an output signal of a MG1 speed sensor 64 indicative of an MG1 rotational speed Ng which is a rotational speed of the first rotating machine MG1; an output signal of a MG2 speed sensor 66 indicative of the MG2 rotational speed Nm which is the rotational speed of the second rotating machine MG2 and which corresponds to the AT input rotational speed Ni; an output signal of an accelerator-opening degree sensor 68 indicative of an accelerator opening degree θacc representing an amount of accelerating operation made by the vehicle driver; an output signal of a throttle-opening degree sensor 70 indicative of a throttle opening degree θth; an output signal of a brake pedal sensor 71 indicative of a brake-ON signal Bon representing a state of depression of a brake pedal by the vehicle driver to operate wheel brakes and also a braking operation amount Bra representing an amount of depression of the brake pedal by the vehicle driver; an output signal of a steering sensor 72 indicative of a steering angle θsw and a steering direction Dsw of a steering wheel provided in the vehicle 10 and also a steering ON signal SWon representing a state in which the steering wheel is being held by the vehicle driver; an output signal of a driver condition sensor 73 indicative of a driver condition signal Dry representing a condition of the vehicle driver; an output signal of a G senor 74 indicative of a longitudinal acceleration Gx and a lateral acceleration Gy of the vehicle 10; an output signal of a yaw rate sensor 76 indicative of a yaw rate Ryaw that is an angular speed around a vertical axis of the vehicle 10; an output signal of a battery sensor 78 indicative of a battery temperature THba, a charging/discharging electric current Ibat and a voltage Vbat of the battery 54; an output signal of a fluid temperature sensor 79 indicative of a working fluid temperature THoil that is a temperature of the working fluid OIL; an output signal of a vehicle-area information sensor 80 indicative of vehicle area information Iard; an output signal of a vehicle location sensor 81 indicative of location information Ivp; an output signal of an external-network communication antenna 82 indicative of an communication signal Scom; an output signal of a navigation system 83 indicative of navigation information Inavi; output signals of drive-assist setting switches 84 indicative of drive-assist setting signals Sset representing a setting made by the vehicle driver for execution of a drive-assist control such as automatic drive control and a cruise control; an output signal of a shift position sensor 85 indicative of an operation position POSsh of a shift lever provided in the vehicle 10; and an output signal of a parking brake sensor 87 indicative of a parking ON signal PKBon representing an ON (operated) state of a parking brake 75.

The running control device 90 generates various output signals to the various devices provided in the vehicle 10, such as: an engine control command signal Se that is to be supplied to the engine control device 50 for controlling the engine 14, rotating-machine control command signals Smg that are to be supplied to the inverter 52 for controlling the first and second rotating machines MG1, MG2; hydraulic control command signal Sat that is to be supplied to the hydraulic control unit 56 for controlling the operation states of the engagement devices CB; the communication signal Scom that is to be supplied to the external-network communication antenna 82; a brake-control command signal Sbra that is supplied to a wheel brake device 86, for controlling a braking torque generated by the wheel brake device 86; a steering-control command signal Sste that is to be supplied to a steering device 88, for controlling steering of wheels (especially, front wheels) of the vehicle 10; and an information-notification-control command signal Sinf that is to be supplied to an information notification device 89, for warning and notifying information to the vehicle driver.

For performing various control operations in the vehicle 10, the running control device 90 further includes an AT shift control means in the form of an AT shift control portion 94, a hybrid control means in the form of a hybrid control portion 95, and a driving control means in the form of a driving control portion 96.

The AT shift control portion 94 is configured to determine whether a shifting action is to be executed or not in the step-variable transmission portion 20, by using, for example, an AT-gear-position shifting map (not shown), which is a relationship obtained by experimentation or determined by an appropriate design theory, and to execute a shift control operation in the step-variable transmission portion 20 as needed. The AT-gear-position shifting map represents a predetermined relationship between two variables in the form of the vehicle running speed V and the required drive force Frdem, for example, wherein the relationship is used in the shift control operation executed in the step-variable transmission portion 20, and wherein the AT-gear-position shifting map contains a plurality of shifting lines in two-dimensional coordinates in which the running speed V and a required drive force Frdem are taken along respective two axes. The shifting lines are used to determine whether the shifting action is to be executed in the step-variable transmission portion 20, namely, whether a currently established one of the AT gear positions is to be switched to another one of the AT gear positions.

The hybrid control portion 95 has a function serving as an engine control means or portion for controlling the operation of the engine 14 and a function serving as a rotating machine control means or portion for controlling the operations of the first rotating machine MG1 and the second rotating machine MG2 via the inverter 52, and executes a hybrid drive control, for example, using the engine 14, the first rotating machine MG1 and the second rotating machine MG2 through these control functions. The hybrid control portion 95 calculates a drive request amount in the form of the required drive force Frdem [N] that is to be applied to the drive wheels 28, by applying the accelerator opening degree θacc and the vehicle running speed V to, for example, a drive request amount map that is a predetermined relationship. The required drive torque Trdem [Nm] applied to the drive wheels 28, a required drive power Prdem [W] applied to the drive wheels 28 or a required AT output torque applied to the output shaft 22, for example, can be used as the drive request amount, in addition to the required drive force Frdem [N].

For example, when the continuously variable transmission portion 18 is operated as a continuously variable transmission, the hybrid control portion 95 controls the engine 14 and controls the generated electric power Wg of the first rotating machine MG1 so as to attain the engine rotational speed Ne and the engine torque Te at which the engine power Pe achieving the required drive power Prdem is acquired in consideration of an optimum engine operation point, for example, and thereby provides the continuously variable shift control of the continuously variable transmission portion 18 to change the gear ratio γ0 of the continuously variable transmission portion 18.

The hybrid control portion 95 selectively establishes a motor running mode or a hybrid running mode as the running mode depending on a driving state, so as to cause the vehicle 10 to run in a selected one of the running modes. For example, the hybrid control portion 95 selects and establishes the motor running mode when the required drive power Prdem is in an motor running region that is smaller than a threshold value, and selects and establishes the hybrid running mode when the required drive power Prdem is in a hybrid running region that is not smaller than the threshold value.

The driving control portion 96 is capable of executing, as a drive control for driving the vehicle 10, a selected one of a manual drive control for driving the vehicle 10 in accordance with driving operations made by the vehicle driver and an automatic drive control for automatically driving the vehicle 10 without depending on the driving operations executed by the vehicle driver. In the automatic drive control, for example, the vehicle 10 is accelerated, decelerated, braked and steered, depending on a target driving state that is automatically determined based on, for example, a map information and a destination point inputted by the vehicle driver. When an automatic drive mode is selected with an automatic-drive selecting switch of the drive-assist setting switches 84 being placed in ON by the vehicle driver, the driving control portion 96 establishes the automatic drive mode so as to execute the automatic drive control. Further, the driving control portion 96 is capable of executing a cruise control by operating a cruise control system as a drive assist control system, for keeping a constant running speed, a constant distance to another vehicle preceding the vehicle 10 and keeping the vehicle 10 to run within a selected road lane.

The vehicle 10 further includes a transceiver 100, a first gateway ECU 110, a wireless-update control device 120, a second gateway ECU 140 and a connector 150. It is noted that the above-described running control device 90, first gateway ECU 110, wireless-update control device 120 and second gateway ECU 140 cooperate to constitute a vehicle control apparatus 180.

The transceiver 100 is a device configured to communicate with an external server 200 as an external device which is present apart from the vehicle 10 and is provided outside the vehicle 10. The transceiver 100 is connected to the external server 200 through a wireless communication.

The first gateway ECU 110 is connected to the transceiver 100. The first gateway ECU 110 functionally includes a data receiving portion 112 and a data transmitting portion 114. The data receiving portion 112 is configured to receive a plurality of kinds of new softwares 202, by using the transceiver 100, wherein the new softwares 202 are to be transmitted from the external server 200 through the wireless communication. The data transmitting portion 114 is configured to transmit the received new softwares 202 to the wireless-update control device 120.

The wireless-update control device 120 is a control device configured to control updates of a plurality of kinds of vehicle control softwares 92 in the vehicle 10. Specifically, the wireless-update control device 120 updates (rewrites) some or all of the plurality of kinds of vehicle control softwares 92 that are stored in a first storage portion 98 of the running control device 90, by using the plurality of kinds of new softwares 202 transmitted from the first gateway ECU 110.

Each of the first gateway ECU 110 and the wireless-update control device 120 has substantially the same hardware construction as the running control device 90. Each of the first gateway ECU 110 and the wireless-update control device 120 is configured to receive the new softwares 202 through the wireless communication, for example, from the external server 200 as the external device provided outside the vehicle 10, and to execute the updates (rewritings) of the vehicle control softwares 92 stored in the first storage portion 98 (e.g., ROM) that is provided in the running control device 90, by using the received new softwares 202. The vehicle control softwares 92 are softwares that are to be used in a plurality of kinds of controls executed by the running control device 90 in the vehicle 10. That is, the running control device 90 is configured to rewrite the vehicle control softwares 92, as needed, which are stored in the first storage portion 98 for controlling the vehicle 10. The vehicle control softwares 92 include a plurality of kinds of vehicle control programs 92P that define control procedures in the vehicle 10, and a plurality of kinds of control data 92D that are to be used when the vehicle 10 is controlled in accordance with the vehicle control programs 92P.

The second gateway ECU 140 also has substantially the same hardware construction as the running control device 90. The second gateway ECU 140 is connected to an external rewriting device 160 via the connector 150, and is configured to rewrite the plurality of kinds of vehicle control softwares 92 by using the external rewriting device 160. Although the vehicle 10 and the external rewriting device 160 are connected to each other via the connector 150 through a wire communication, they may be connected to each other through a wire-less communication.

The connector 150 is provided to enable the external rewriting device 160 to be connected to the vehicle 10, wherein the external rewriting device 160 is the external device that is provided outside the vehicle 10. A shape of the connector 150 and an electrical signal that is to be transmitted through the connector 150 are defined or determined by a known standard. The connector 150 can be used also as a connector through which a failure diagnostic device is connected to the vehicle 10.

The external rewriting device 160 is to be connected directly to an in-vehicle network of the vehicle 10, so that the external rewriting device 160 as well as the running control device 90, for example, can receive CAN (Controller Area Network) frame through the in-vehicle network and transmit the CAN frame to the in-vehicle network.

The external server 200 is a system connected to a network that is provided outside the vehicle 10. The external server 200 is configured to store therein the new softwares 202 uploaded thereto, and to transmit the new softwares 202 to the vehicle 10 as needed. The external server 200 serves as a software distribution center for distributing the new softwares 202. The new softwares 202 are softwares to which the current vehicle control softwares 92 are to be updated. That is, the new softwares 202 are to become updated vehicle control softwares 92 after the current vehicle control softwares 92 are updated to the new softwares 202, namely, after the current vehicle control softwares 92 are rewritten to the new softwares 202. The new softwares 202 include a plurality of kinds of new programs 202P to each of which a corresponding one of the vehicle control programs 92P is to be updated (rewritten), and also a plurality of kinds of new data 202D to each of which a corresponding one of the control data 92D is to be updated (rewritten). Each of the new programs 202P is to become an updated vehicle control program 92Pr after the corresponding current vehicle control program 92P is updated to the new program 202P, namely, after the corresponding current vehicle control program 92P is rewritten to the new program 202P. Each of the new data 202D is to become an updated control data 92Dr after the corresponding current control data 92D is updated to the new data 202D, namely, after the corresponding current control data 92D is rewritten to the new data 202D.

For performing function of updating the plurality of kinds of vehicle control softwares 92, the wireless-update control device 120 includes a software updating means in the form of a software updating portion 122 and a second storage portion 124 such as a rewritable ROM. It is noted that the software updating portion 122 corresponds to "updating portion" recited in the appended claims.

When receiving the new software 202 transmitted from the external server 200 to the vehicle 10 through the wireless communication, the software updating portion 122 writes the new software 202 into the second storage portion 124, and stores the new software 202 as an update software 126 in the second storage portion 124. The update software 126 includes an update program 126P that is the new program 202P stored in the second storage portion 124, and also an update data 126D that is the new data 202D stored in the second storage portion 124. The software updating portion 122 determines whether the update software 126 has been written into the second storage portion 124 or not, namely, whether the update software 126 is stored in the second storage portion 124 or not. When determining that the update software 126 is stored in the second storage portion 124, the software updating portion 122 updates the vehicle control software 92 (that is subjected to be updated or rewritten) to the update software 126.

The vehicle control software 92 includes the vehicle control program 92P and the control data 92D. The vehicle control program 92P includes, for example, an engine program 92Peg that is an engine control program to be used for controlling the engine 14 by the hybrid control portion 95, an MG1 program 92Pm1 that is a first-rotating-machine control program to be used for controlling the first rotating machine MG1 by the hybrid control portion 95, an MG2 program 92Pm2 that is a second-rotating-machine control program to be used for controlling the second rotating machine MG2 by the hybrid control portion 95, and an AT program 92Pat that is an automatic-transmission control program to be used for controlling the step-variable transmission portion 20 by the AT shift control portion 94.

The control data 92D includes a plurality of kinds of shifting lines SH (that are used for determining whether a shifting action is to be executed or not in the step-variable transmission portion 20), a running-mode switching line CHt (that is used for determining whether the running mode is to be switched from one of the motor running mode and the hybrid running mode to another), control values Sct (used for controlling the vehicle 10), and limit values GD for limiting correction values or amounts which are obtained through learning control and by which the respective control values Sct are to be corrected. The control values Sct are various command values based on, for example, the above-described engine control command signal Se, rotating-machine control command signals Smg, hydraulic control command signal Sat, brake-control command signal Sbra and steering-control command signal Sste. The control values Sct include an engaging-pressure command value as the hydraulic control command signal Sat in accordance with which the engaging pressure of the engagement device CB, whose operation state is switched in process of a shifting action executed in the step-variable transmission portion 20 by the AT shift control portion 94, is controlled to be changed. The AT shift control portion 94 corrects the engaging-pressure command value through the learning control, for example, such that the shifting action can be completed in the step-variable transmission portion 20 within an appropriate length of time, with a shifting shock being suppressed. The limit values GD are guard values provided for the respective various control values Sct, for example, such that each of the control values Sct is not changed excessively by the learning control.

Hereinafter, there will be described update of the vehicle control software 92 that is to be executed when the new software 202 (update software 126) is transmitted from the external server 200. When determining that the update software 126 is stored in the second storage portion 124, the software updating portion 122 executes the update of a part or an entirety of the vehicle control software 92 by using the update software 126.

By the way, when the vehicle control software 92 has been updated to the update software 126, the vehicle 10 is controlled based on the update software 126. In this instance, if the update contains an error by some reason, there is a risk that the vehicle 10 would not operate normally. For avoiding a situation in which the vehicle 10 does not operate normally after update of the vehicle control software 92, the wireless-update control device 120 functionally includes an operation checking means in the form of an operation check portion 128 that is configured, when the update software 126 is stored in the second storage portion 124, to make an operation check as to whether the vehicle 10 operates normally or not, by executing processing of the update software 126. When it is checked by the operation check portion 128 that the vehicle 10 operates normally with the processing of the update software 126, the software updating portion 122 is configured to update the vehicle control software 92 to the update software 126. Thus, prior to the update of the vehicle control software 92 to the update software 126, the operation check as to whether the vehicle 10 would operate normally after the update of the vehicle control software 92 to the update software 126 is made whereby a reliability of the vehicle 10 after the update is improved. It is noted that each of the first and second storage portions 98, 124 corresponds to "storage portion" recited in the appended claims, the vehicle control software 92 corresponds to "vehicle control software" recited in the appended claims, and the update software 126 corresponds to "update software" recited in the appended claims.

In this arrangement with the operation check being made prior to the update of the vehicle control software 92 to the update software 126, if the vehicle 10 is in a runnable state in which the vehicle 10 is enabled to run, during the processing of the update software 126 for the operation check, there is a risk that an unintentional behavior of the vehicle 10 such as sudden movement of the vehicle 10 could be caused due to the processing of the update software 126. Therefore, in the present embodiment, the operation check portion 128 makes the operation check as to whether the vehicle 10 operates normally or not, by executing the processing of the update software 126 on condition that the vehicle 10 is in a vehicle stopped state in which the vehicle 10 is mechanically suppressed from being moved in forward and reverse directions.

Prior to the processing of the update software 126 for the operation check, the operation check portion 128 determines whether the vehicle 10 is in the vehicle stopped state or not. In this instance, the operation check portion 128 determines whether the vehicle 10 is in the vehicle stopped state or not, depending on whether an operation range of the power transmission apparatus 12 is the P range (vehicle stop range) or not, or whether the parking brake 75 is in the ON state (that is represented by the parking ON signal PKBon) or not. It may be determined whether the operation range of the power transmission apparatus 12 is the P range or not, for example, depending on whether the shift lever 46 is placed in the P position as one of the operation positions POSsh or not. It may be determined whether the parking brake 75 is in the ON state or not, for example, depending on whether the parking ON signal PKBon supplied from the parking brake sensor 87 is present or not.

When determining that the vehicle 10 is in the vehicle stopped state, the operation check portion 128 determines that the processing of the update software 126 can be executed for the operation check. On the other hand, when determining that the vehicle 10 is in the runnable state, i.e., in a state other than the vehicle stopped state, the operation check portion 128 determines that the processing of the update software 126 cannot be executed. Thus, the processing of the update software 126 is executed, on condition that the vehicle 10 is in the vehicle stopped, and the operation check as to whether the vehicle 10 operates normally or not, with the processing of the update software 126. With the processing of the update software 126 being executed for the operation check on condition that the vehicle 10 is in the vehicle stopped, it is possible to improve the reliability of the vehicle 10 while suppressing the unintentional behavior of the vehicle 10 during the processing of the update software 126 for the operation check.

When it is determined that the vehicle 10 is in the vehicle stopped state, the operation check portion 128 inquires an occupant of the vehicle 10 whether the operation check can be made or not, and executes the processing of the update software 126 to make the operation check when a permission is given by the occupant of the vehicle 10 to make the operation check. To this end, the operation check portion 128 causes an in-car display of a touch panel, for example, to display a permission button and a non-permission button, wherein the permission button is to be pressed when the vehicle occupant gives a permission to the processing of the update software 126 (as to make the operation check), and the non-permission button is to be pressed when the vehicle occupant does not give the permission to the processing of the update software 126. Thus, when the permission button is selected to be pressed, it is determined that the permission is given to the processing of the update software 126. When the non-permission button is selected to be pressed, it is determined that the permission is not given to the processing of the update software 126. When the permission is given by the vehicle occupant to the processing of the update software 126, the operation check portion 128 executes the processing of the update software 126 for the operation check. When the permission is not given by the vehicle occupant to the processing of the update software 126, the operation check portion 128 waits until the permission is given to the processing of the update software 126. Thus, even in the vehicle stopped state in which the processing of the update software 126 is executable, the inquiry is made to ask the vehicle occupant the permission to the processing of the update software 126 for the operation check, so that the processing of the update software 126 is never executed without permission of the vehicle occupant. That is, the vehicle occupant can know in advance that the processing of the update software 126 will be executed, thereby improving convenience for the vehicle occupant. Further, when the processing of the update software 126 is initiated, the operation check portion 128 causes the in-car display to indicate that the operation check is being made, so as to inform the vehicle occupant that the processing of the update software 126 is being executed.

When the vehicle 10 is in the vehicle stopped state and the permission is given by the vehicle occupant to the operation check made by the processing of the update software 126, the operation check portion 128 executes the processing of the update software 126, so as to make the operation check as to whether each of electrically-operated components operate normally with the processing of the update software 126 or not. The electrically-operated components may be, for example, electric devices or parts, such as the first rotating machine MG1, second rotating machine MG2, linear solenoids (of the respective engagement devices CB provided in the step-variable transmission portion 20) and electrically-operated oil pump, which are to be controlled by the running control device 90. The operation check portion 128 determines whether each of the electrically-operated components operates normally or not, with the processing of the update software 126, depending on whether a command signal is normally supplied to each of the electrically-operated components or not, or depending on whether each of the electrically-operated components operates normally or not by the supplied command signal, when the processing of the update software 126 is executed. Thus, the operation check is made as to whether the vehicle 10 operates normally or not, by checking whether the electrically-operated components operate normally or not, with the processing of the update software 126. That is, the determination as to whether the electrically-operated components operate normally or not corresponds to the operation check as to whether the vehicle 10 operates normally or not.

In a case in which the update software 126 is related to the shift control of the step-variable transmission portion 20, for example, a command signal (drive current) is supplied to each of the linear solenoids as the electrically-operated components provided in the respective engagement devices CB that are to be operated in execution of the shift control with the processing of the update software 126. In this instance, it is determined whether each of the linear solenoids operates normally or not, depending on whether the command signal is supplied to each of the linear solenoids or not, in execution of the processing of the update software 126. This determination (as to whether each of the linear solenoids operates normally or not) can be made also by actually driving the electrically-operated oil pump so as to operate the engagement devices CB as in the actual execution of the shift control, and an actual pressure value of the working fluid supplied to each of the engagement devices CB is detected in process of the execution of the shift control, so that the determination is made depending on the detected pressure value of the working fluid. It is noted that, where the plurality of electrically-operated components such as the linear solenoids are operated concurrently with each other in the execution of the shift control with the processing of the update software 126, the operation checks may be made to the plurality of electrically-operated components concurrently to each other.

In a case in which it is difficult to actually operate the electrically-operated components (such as the rotating machine) in the vehicle stopped state, for example, where the update software 126 is related to operation of the first rotating machine MG1 or second rotating machine MG2, the operation check may be made by processing the update software 126 in a simulated manner in the vehicle control apparatus 180. In this manner in which the update software 126 is processed in the simulated manner, the operation check as to whether each of the electrically-operated components operate normally or not, is made based on a simulated command signal supplied to each of the electrically-operated components.

In a case in which the update software 126 is related to a certain shifting pattern (such as a shift-up action from a first gear position to a second gear position), for example, the operation check is made to each of the linear solenoids that are operated in the certain shifting pattern with the processing of the update software 126. Further, in a case in which the update software 126 is related to shift-up actions executed in the step-variable transmission portion 20, for example, the shift-up actions are executed sequentially from a lowest-speed gear position (i.e., first gear position) to a highest-speed gear position with the processing of the update software 126, and the operation checks are made to all of the linear solenoids that are operated in the shift-up actions.

In the above-described case in which the update software 126 is related to the shift-up actions, where the linear solenoids, which are operated in processes of the shift-up actions from the lowest-speed gear position to the highest-speed gear position of the step-variable transmission portion 20, consist of a total of A pieces of the linear solenoids, for example, the operation check is made to each linear solenoid [n] (n=1 . . . A), which is operated in the processes of the shift-up actions, with the processing of the update software 126. In this instance, the operation check portion 128 sets a flag when the operation check has been made to each of the A pieces of the linear solenoids, so that it is determined whether the operation checks have been completed for all of the linear solenoids or not, namely, whether the processing of the update software 126 has been completed or not, depending on whether a number Nflag of times of setting of the flag has reached A times that corresponds to the number of the linear solenoids to be operated in the processing of the update software 126. The operation check portion 128 keeps the operation check to be continued until the number Nflag of times (of setting of the flag) reaches the A times, and terminates the operation check when the number Nflag of times has reached the A times.

Further, during the processing of the update software 126, the operation check portion 128 determines whether the vehicle 10 is in the vehicle stopped state or not, depending on whether the P range as one of the shift ranges is established in the power transmission apparatus 12 or not, or depending on whether the parking brake 75 is in the ON (operated) state or not. The operation check portion 128 keeps making the operation check with the processing of the update software 126 being continued, as long as it is determined that the P range is established in the power transmission apparatus 12 or that the parking brake 75 is in the ON state. On the other hand, the operation check portion 128 immediately stops making the operation check with the processing of the update software 126 being discontinued, when it is determined that the vehicle 10 has been switched to the runnable state by switching of the shift lever 46 from the P position as one of the operation positions POSsh to a non-P position that is other than the P position, or by switching of the parking brake 75 from the ON state to an OFF state. Thus, with the processing of the update software 126 being discontinued, it is possible to suppress the unintentional behavior of the vehicle 10 that could be caused if the processing of the update software 126 is continued in the runnable state of the vehicle 10. Further, with the processing of the update software 126 being discontinued, even in the event of an unexpected situation such as running of other vehicle toward the vehicle 10, the vehicle 10 can be moved whereby the reliability of the vehicle 10 can be improved.

Further, the switching between the P range and the non-P range in the power transmission apparatus 12 is electrically made by operation of the electric motor 40, as described above, so that, even when the shift lever 46 is switched from the P position (vehicle stop position) as one of the operation positions POSsh to the non-P position that is other than the P position, it is possible to delay switching from the P range to the non-P range in the power transmission apparatus 12, by delaying supply of the command signal Sp to the electric motor 40. Therefore, the operation check portion 128 is configured, even when the shift lever 46 is operated to be switched from the P position to the non-P position during the processing of the update software 126 for the operation check, to delay the switching from the P range to the non-P range, until discontinuation of the processing of the update software 126 is completed. Thus, with the switching from the P range to the non-P range being delayed, it is possible to suppress the behavior of the vehicle 10 which is not intended by the vehicle occupant. It is noted that the electric motor 40 corresponds to "electric actuator" recited in the appended claims, and that the switching operation of the shift lever 46 from the P position to the non-P position corresponds to "operation is made to switch from the vehicle stop range to the vehicle non-stop range", which is recited in the appended claims.

Further, the operation check portion 128 determines whether the vehicle 10 is being moved or not during the processing of the update software 126, depending on whether an absolute value Noabs of the output rotational speed No, which is constantly calculated during the processing of the update software 126, is smaller than a predetermined threshold speed value Nolim (Noabs<Nolim) or not. The operation check portion 128 constantly calculates the absolute value Noabs of the output rotational speed No from the output rotational speed No constantly detected during the processing of the update software 126, and determines whether the calculated absolute value Noabs of the output rotational speed No is smaller than the threshold speed value Nolim or not. The threshold speed value Nolim, which is obtained by experimentation or determined by an appropriate design theory, is set to a lower limit of a rotational speed range in which it is determined that the vehicle 10 is being moved.

When the absolute value Noabs of the output rotational speed No is smaller than the threshold speed value Nolim, the operation check portion 128 determines that the vehicle 10 is not being moved, and keeps making the operation check with the processing of the update software 126 being continued. On the other hand, when the absolute value Noabs of the output rotational speed No becomes not smaller than the threshold speed value Nolim, the operation check portion 128 determines that the vehicle 10 is being moved, and suspends making the operation check with the processing of the update software 126 being discontinued, so that the operation check is placed in a standby state. Further, when the vehicle 10 is then placed back into the vehicle stopped state, the operation check portion 128 may execute the processing of the update software 126 again so as to resume the operation check. Thus, when it is determined that the vehicle 10 is being moved during the processing of the update software 126, the processing of the update software 126 is discontinued so that it is possible to an unexpected behavior of the vehicle 10 due to the processing of the update software 126.

When determining that the number Nflag of times of setting of the flag has reached the A times that corresponds to the number of the electrically-operated components that are subjected to the operation checks during the processing of the update software 126, the operation check portion 128 determines that the operation checks have been completed for all of the electrically-operated components, and terminates the operation checks. In addition, the operation check portion 128 informs the vehicle occupant of the termination of the operation checks, for example, by indicating the termination in the in-car display. When it is checked by the operation check portion 128 that the vehicle 10 will operate normally still after the vehicle control software 92 is updated to the update software 126, the software updating portion 122 updates the vehicle control software 92 stored in the first storage portion 98, to the update software 126. On the other hand, when it is not checked that the vehicle 10 operates normally, for example, when defect is found in operation of at least one of the electrically-operated components during the operation checks made by the operation check portion 128, the software updating portion 122 withholds the update of the vehicle control software 92 to the update software 126.

Figure 3:
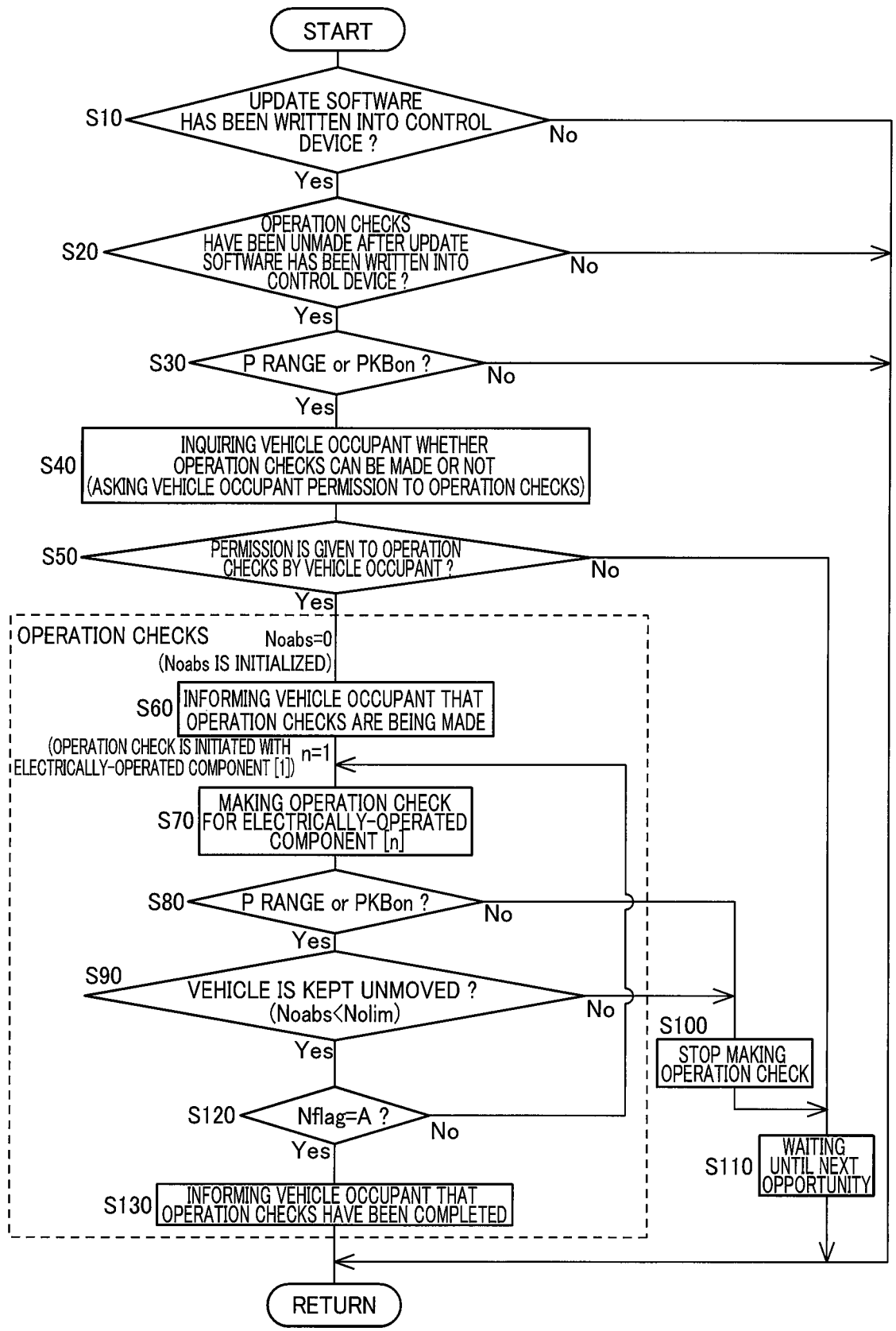
FIG. 3 is a flow chart showing a main part of a control routine that is to be executed by a vehicle control apparatus, when a vehicle control software is to be updated to an update software, to suppress an unintentional behavior of a vehicle that could be caused during an operation check that is made as to whether the vehicle could operate normally or not by executing processing of the update software.

FIG. 3 is a flow chart showing a main part of a control routine that is to be executed by the vehicle control apparatus 180 provided in the vehicle 10, when the vehicle control software 92 is to be updated to the update software 126, to suppress the unintentional behavior of the vehicle 10 that could be caused during the operation checks that are made as to whether the vehicle 10 could operate normally or not by executing processing of the update software 126. This control routine is executed at a predetermined time interval in a repeated manner. It is noted that, in the flow chart of FIG. 3, steps S60 through S90, S120 and S130, which are surrounded by broken line, are steps at which the operation checks are made to the electrically-operated components.

As shown in FIG. 3, the control routine is initiated with step S10 corresponding to control function of the software updating portion 122, which is implemented to receive the update software 126 from the external server 200, and then to determine whether the received update software 126 has been written into the second storage portion 124 of the wireless-update control device 120 or not. When a negative determination is made at step S10, one cycle of execution of the control routine is terminated. When an affirmative determination is made at step S10, step S20 corresponding to control function of the software updating portion 122 is implemented to determine whether or not the operation checks have been unmade to the electrically-operated components that are to be operated with the processing of the update software 126 stored in the second storage portion 124. When a negative determination is made at step S20, namely, when the operation checks have been made, one cycle of execution of the control routine is terminated. When an affirmative determination is made at step S20, namely, when the operation checks have not yet been made, step S30 corresponding to control function of the operation check portion 128 is implemented to determine whether the vehicle 10 is in the vehicle stopped state or not, depending on whether the P range (corresponding to the vehicle stop range) is established in the power transmission apparatus 12 or not, or depending on whether the parking brake 75 is in the ON state or not. When a negative determination is made at step S30, one cycle of execution of the control routine is terminated.

When an affirmative determination is made at step S30, step S40 corresponding to control function of the operation check portion 128 is implemented to inquire the vehicle occupant whether the operation checks can be made or not. Then, at step S50 corresponding to control function of the operation check portion 128, it is determined whether the permission is given to make the operation checks by the vehicle occupant or not. When a negative determination is made at step S50, the control flow goes to step S110 corresponding to control function of the operation check portion 128, at which the operation checks with the processing of the update software 126 are in standby until the permission is given to make the operation checks by the vehicle occupant.

When an affirmative determination is made at step S50, step S60 corresponding to control function of the operation check portion 128 is implemented to start the operation checks with the processing of the update software 126, and to indicate in the in-car display that the operation checks are being made, so as to inform the vehicle occupant that the operation checks are being made. It is noted that, when the processing of the update software 126 is started, the absolute value Noabs of the output rotational speed No, based on which it is determined whether the vehicle 10 is being moved or not during the operation checks, is initialized to zero. In addition, the number Nflag of times of setting of the flag, which is used for determining whether the operation check has been made for each electrically-operated component [n] (n=1 . . . A) operated with the processing of the update software 126, is initialized to zero.

Then, step S70 corresponding to control function of the operation check portion 128 is implemented to make the operation checks sequentially for the A pieces of the electrically-operated components that are operated with the processing of the update software 126. In this instance, it is determined whether the vehicle 10 operates normally or not, with the processing of the update software 126, depending on whether the command signals are normally supplied to the electrically-operated components or not, or depending on whether the electrically-operated components operate normally or not by the supplied command signals, during the processing of the update software 126. It is noted that each of the operation checks may be made also by processing the update software 126 in a simulated manner in the vehicle control apparatus 180, so that the operation check as to where the electrically-operated component operates normally or not, is made based on a simulated command signal supplied to the electrically-operated component. It is further noted that when the operation check has been completed for each electrically-operated component [n] (n=1 . . . A), the above-described flag is set whereby the number Nflag of times of setting of the flag is counted up.

At step S80 corresponding to control function of the operation check portion 128, it is determined whether the P range is established in the power transmission apparatus 12 or not, or whether the parking brake 75 is in the ON state or not, during the operation check made for each electrically-operated component [n]. When the P range is switched to the non-P range or the parking brake 75 is placed in the OFF state during the operation check, a negative determination is made at step S80 whereby the control flow goes to step S100 corresponding to control function of the operation check portion 128, which is implemented to stop making the operation check with the processing of the update software 126 being discontinued. When an affirmative determination is made at step S80, step S90 corresponding to control function of the operation check portion 128 is implemented to determine whether the vehicle 10 is kept unmoved or not, depending on whether the absolute value Noabs of the output rotational speed No is smaller than the threshold speed value Nolim. When a negative determination is made at step S90, namely, when it is determined that the vehicle 10 is being moved, the control flow goes to step S100 that is implemented to stop making the operation check with the processing of the update software 126 being discontinued. When an affirmative determination is made at step S90, step S120 corresponding to control function of the operation check portion 128 is implemented to determine whether the number Nflag of times of setting of the flag has reached the A times or not, namely, whether the operation checks have been completed for all of the electrically-operated components or not. When a negative determination is made at step S120, the control flow goes back to step S70 that is implemented to continue making the operation checks with the processing of the update software 126. When an affirmative determination is made at step S120, namely, when the operation checks have been completed for all of the electrically-operated components, step S130 corresponding to control function of the operation check portion 128 is implemented to indicate in the in-car display that the operation checks have been completed so as to inform the vehicle occupant that the operation checks have been completed.

As described above, in the present embodiment, when the operation check as to whether the vehicle 10 operates normally or not is to be made by executing the processing of the update software 126, the operation check portion 128 executes the processing of the update software 126 on condition that the vehicle 10 is in the vehicle stopped state in which the vehicle 10 is suppressed from being moved in the forward and reverse directions. Therefore, it is possible to suppress the unintentional behavior of the vehicle 10 that could be caused during the operation check and to improve the reliability of the vehicle 10.

In the present embodiment, the operation check portion 128 inquires the vehicle occupant whether the operation check can be made or not, and executes the processing of the update software 126 when the permission is given by the vehicle occupant to make the operation check, so that it is possible to improve the convenience for the vehicle occupant. Further, when the vehicle 10 is switched from the vehicle stopped state to the runnable state during the processing of the update software 126, the processing of the update software 126 is discontinued, so that it is possible to suppress the unintentional behavior of the vehicle 10 that could be caused if the processing of the update software 126 is continued in the runnable state of the vehicle 10. Moreover, when the operation is made to switch from the vehicle stop range to the vehicle non-stop range during the processing of the update software 126, the switching from the vehicle stop range to the vehicle non-stop range is delayed until the discontinuation of the processing of the update software 126 is completed, so that it is possible to suppress the unintentional behavior of the vehicle 10, which has not been expected by the vehicle occupant.

While the preferred embodiment of the present invention has been described in detail by reference to the drawings, it is to be understood that the invention may be otherwise embodied.

For example, in the above-described embodiment, the determination as to whether the P range is established in the power transmission apparatus 12 or not, or the parking brake 75 is in the ON state or not, is made, in addition to the determination as to whether the vehicle 10 is being moved or not. However, both of the two determinations do not have to be necessarily made, as long as at least one of the two determinations is made.

In the above-described embodiment, prior to the operation check for each of the electrically-operated components that are to be operated with the processing of the update software 126, the vehicle occupant is inquired whether the operation check can be made or not, and the operation check is made when the permission to make the operation check is given by the vehicle occupant. However, the operation check may be made without the permission of the vehicle occupant, as long as the vehicle 10 is in the vehicle stopped state.

In the above-described embodiment, when the permission to make the operation check is not given by the vehicle occupant, the operation check is in standby by until the permission is given the vehicle occupant. However, where the update software 126 is an important software, it is possible to employ a control arrangement in which the vehicle 10 cannot be moved or driven until the operation check has been made, for example, by placing a power switch of the vehicle 10 in its OFF state until the permission to make the operation check is not given by the vehicle occupant.

In the above-described embodiment, the operation check is made by executing the processing of the update software 126 when the update software 126 has been transmitted from the external server 200. However, it is also possible to make the vehicle 10 inquire the external server 200 whether the new software 202 (update software 126) is stored in the external server 200 or not, so that, when the new software 202 is stored in the external server 200, the operation check is made after the new software 202 has been received from the external server 200. Further, it is possible to employ a control arrangement in which the external server 200 is configured to supply, to the vehicle 10, a signal notifying that the new software 202 is stored in the external server 200, such that the operation check is made after the new software 202 has been received from the external server 200 in a case in which the signal is supplied from the external server 200.

In the above-described embodiment, the operation of the shift lever 46 made by the vehicle occupant is electrically transmitted through the electric motor 40 to the power transmission apparatus 12 whereby a selected one of the P range and the non-P range is established in the power transmission apparatus 12. However, this arrangement is not essential. That is, the present invention is applicable also to a vehicle in which the operation of the shift lever 46 made by the vehicle occupant is mechanically transmitted to the power transmission apparatus 12 whereby a selected one of the P range and the non-P range is established in the power transmission apparatus 12. In this vehicle, since it is difficult to delay switching from the P range to the non-P range, the operation check is suspended immediately when the shift lever 46 is operated to be placed into the non-P position during the operation check.

In the above-described embodiment, the determination as to whether the P range is established in the power transmission apparatus 12 or not is made depending on whether the shift lever 46 is placed in the P position as one of the operation positions POSsh or not. However, the means for determining whether the P range is established in the power transmission apparatus 12 or not, may be modified as needed. For example, the determination may be made depending on whether the electric motor 40 (by which the parking lock mechanism 42 is operated) is in a rotational position corresponding to the P range or not.

In the above-described embodiment, the permission button and the non-permission button are displayed in the in-car display of the touch panel, for inquiring the vehicle occupant whether the operation check can be made or not, so that it is determined whether the permission to the operation check is given by the vehicle occupant or not, depending on which one of the permission button and the non-permission button is selected to be pressed by the vehicle occupant. However, the means for inquiring the vehicle occupant whether the operation check can be made or not may be modified as needed. The inquiry may be made to the vehicle occupant, for example, by voice or sound.

In the above-described embodiment, the vehicle 10 is provided with the power transmission apparatus 12 including the continuously-variable transmission portion 18 and the step-variable transmission portion 20 that are connected to each other in series. However, the provision of the power transmission apparatus 12 including the continuously-variable transmission portion 18 and the step-variable transmission portion 20 is not essential. For example, in the vehicle to which the present invention is applied, an engine and a rotating machine may be connected to each other without provision of the differential mechanism 32 or the like therebetween, and a step-variable transmission may be provided between drive wheels and the drive power sources (i.e., the engine and the rotating machine), wherein the step-variable transmission may be replaced with a belt-type continuously-variable transmission.

In the above-described embodiment, the vehicle 10 is a hybrid electric vehicle having the drive power sources in the form of the engine 14 and the second rotating machine MG2. However, the vehicle to which the present invention is applied does not have to be necessarily a hybrid electric vehicle, but may be an engine vehicle or electric vehicle having only one drive power source in the form of the engine 14 or rotating machine, for example. That is, the present invention is not limited to vehicles having certain types of drive power sources and certain types of drive systems, for example.

It is to be understood that the embodiment described above is given for illustrative purpose only, and that the present invention may be embodied with various modifications and improvements which may occur to those skilled in the art.

NOMENCLATURE OF ELEMENTS

10: vehicle
40: electric motor (electric actuator)
92: vehicle control software
98: first storage portion (storage portion)
122: software updating portion (updating portion)
124: second storage portion (storage portion)
126: update software
128: operation check portion
180: vehicle control apparatus

What is claimed is:

1. A vehicle control apparatus comprising:
   a storage portion configured to store therein a vehicle control software for controlling a vehicle;
   an updating portion configured to update the vehicle control software stored in the storage portion, to an update software, and
   an operation check portion configured, when the update software is stored in the storage portion, to make an operation check as to whether the vehicle operates normally or not, by executing processing of the update software on condition that the vehicle is in a vehicle stopped state in which the vehicle is suppressed from being moved in forward and reverse directions,
   wherein, when it is checked by the operation check portion that the vehicle operates normally with the processing of the update software, the updating portion is configured to update the vehicle control software to the update software.

2. The vehicle control apparatus according to claim 1, wherein the operation check portion is configured to inquire an occupant of the vehicle whether the operation check can be made or not, and to execute the processing of the update software to make the operation check when a permission is given by the occupant of the vehicle to make the operation check.

3. The vehicle control apparatus according to claim 1, wherein the operation check portion is configured to discontinue the processing of the update software, when the vehicle is switched from the vehicle stopped state to a runnable state in which the vehicle is enabled to run, during the processing of the update software.

4. The vehicle control apparatus according to claim 3,
wherein the vehicle includes an electric actuator that is to be operated to switch between a vehicle stop range and a vehicle non-stop range that is other than the vehicle stop range, such that the vehicle is placed in the vehicle stopped state when the vehicle stop range is established, and wherein the operation check portion is configured, when an operation is made to switch from the vehicle stop range to the vehicle non-stop range during the processing of the update software, to delay switching from the vehicle stop range to the vehicle non-stop range, until discontinuation of the processing of the update software is completed.

\* \* \* \* \*